United States Patent [19]
Keenan et al.

[11] 3,897,153
[45] July 29, 1975

[54] PHASE AND AMPLITUDE BALANCE ADJUSTMENT FOR A DUAL BEAM INFRARED GAS ANALYZER

[75] Inventors: Charles A. Keenan, Irvine; Carl N. Cederstrand, Brea, both of Calif.

[73] Assignee: Beckman Instruments, Inc., Fullerton, Calif.

[22] Filed: July 23, 1973

[21] Appl. No.: 382,005

[52] U.S. Cl. .................. 356/51; 250/345; 350/274; 356/93; 356/206
[51] Int. Cl. ...................... G01n 21/34; G01n 21/22
[58] Field of Search ........ 356/51, 93, 206; 250/343, 250/345, 346, 233; 350/274

[56] References Cited
UNITED STATES PATENTS
2,933,600  4/1960  Spracklen et al. .................. 250/345
3,729,264  4/1973  Simazaki et al. ...................... 356/51

Primary Examiner—Vincent P. McGraw
Attorney, Agent, or Firm—R. J. Steinmeyer; P. R. Harder

[57] ABSTRACT

Phase and amplitude balance adjustment are provided for a gas analyzer of the type in which two infrared beams are generated, one passed through a cell containing a standard and the other through a cell containing a sample gas, constituents in which are to be detected and measured; and there is a detector which compares the energy absorption in the two cells to provide a measure of the gas content. In this type of gas detector there is a chopper consisting of a rotating shutter with two sectors which rotate in front of two apertures through which infrared beams are transmitted from two different infrared beam generators. Phase adjustment is accomplished mechanically by physically moving a mounting plate carrying the two infrared beam generators with respect to the position of the apertures. Amplitude balance adjustment is accomplished by adjusting the relative electrical energy supplied to the two infrared beam generators.

5 Claims, 6 Drawing Figures

PATENTED JUL 29 1975

3,897,153

SHEET 2

PHASE AND AMPLITUDE BALANCE ADJUSTMENT FOR A DUAL BEAM INFRARED GAS ANALYZER

BACKGROUND OF THE INVENTION

Mixtures of substances have been analyzed employing the principle of selective absorption of radiant energy in beams or rays, particularly infrared rays.

In arrangements of the type described in German Pat. No. 730,478 of 1938 use is made of a symmetrical apparatus containing two sources of rays, two cells, one of which, the measurement or sample cell, contains the mixture to be analyzed whereas the other, the standard or reference cell, contains a reference substance and in particular a gas; and there are selective detector means. The arrangement is such that the rays are to be cut off simultaneously by a rotary shutter and the difference between the pulses of the rays obtained in the detector means is measured.

Such a Luft detector or dual-beam infrared instrument that employs simultaneous chopping of sample and reference beams will exhibit a balancing problem of some degree unless the sample and reference channels of its optical bench are truly identical. The greater the amplification required from the infrared analyzer, the more sensitive the analyzer becomes to any phasing and/or amplitude difference between the sample and reference channels. Nevertheless, high amplification is required in order to render the instrument sensitive to minute quantities of particular constituents. Some phasing and amplitude error is unavoidable in a Luft detector by the nature of its internal design because of the difficulty in achieving absolute structural and electrical symmetry in the detector.

Movable shades or vanes have been employed to cover more or less of one of the infrared sources for compensation. However, the inherent unbalance cannot properly be compensated by such a movable shade or vane because the vane cannot adjust independently for both phase and amplitude.

It is accordingly an object of the invention to provide a simple means for compensating the inherent unbalance in dualbeam infrared instruments. A further object of the invention is to provide effective, practical means for independently adjusting for phase and amplitude unbalance.

Other and further objects, features and advantages of the invention will become apparent as the description proceeds.

SUMMARY OF THE INVENTION

In carrying out the invention in accordance with a preferred form thereof a unit in a case or housing is provided for directing one beam of radiant energy through a standard or reference cell and a second, separate beam of radiant energy through a sample or test cell. The housing is formed with two apertures in a wall with a shutter rotating in front of the wall and each of the radiant beam sources behind a different one of the apertures. The shutter is in the form of a pair of sectors attached to a rotating shaft and arranged so as to cover and uncover the apertures intermittently, covering both apertures simultaneously. The radiant beam sources are in a common mounting which is adjustably positioned with respect to the apertures so that the instant of interruption of a beam by the rotating sector may be adjusted by adjusting the mounting position of the radiant beam source. In this manner phase adjustment is accomplished mechanically.

The radiant beam sources are of the electrical type consisting of filaments or electrical resistance heater elements. These elements are connected in series to a current source which has a potentiometer connected across it with a slider connected to the common or junction terminal of the two heater elements so that the voltage and current distribution between the elements may be adjusted by adjusting the position of the potentiometer slider. In this manner amplitude balance is accomplished.

A better understanding of the invention will be afforded by the following detailed description considered in conjunction with the accompanying drawing.

DRAWINGS

In the drawings

FIG. 1 is a functional diagram of a gas detection and measurement system of the Luft type in which the phase and amplitude balance adjustment of the invention may be employed.

FIG. 2 is a perspective view of the encased phase and amplitude balance adjustment unit forming an embodiment of the invention, FIG. 3 is a perspective view from the rear of the apparatus of FIG. 2, FIG. 4 is a schematic diagram of the phase and amplitude balance adjustment unit removed from the casing shown in FIGS. 2 and 3, FIG. 5 is a graph illustrating the relationship between detector output for different settings of the amplitude balance adjustment where there is no out-of-phase component, and FIG. 6 is a graph corresponding to FIG. 5 of detector output with an appreciable out-of-phase component.

Like reference characters are utilized throughout the drawings to designate like parts.

DETAILED DESCRIPTION

Figure 1:
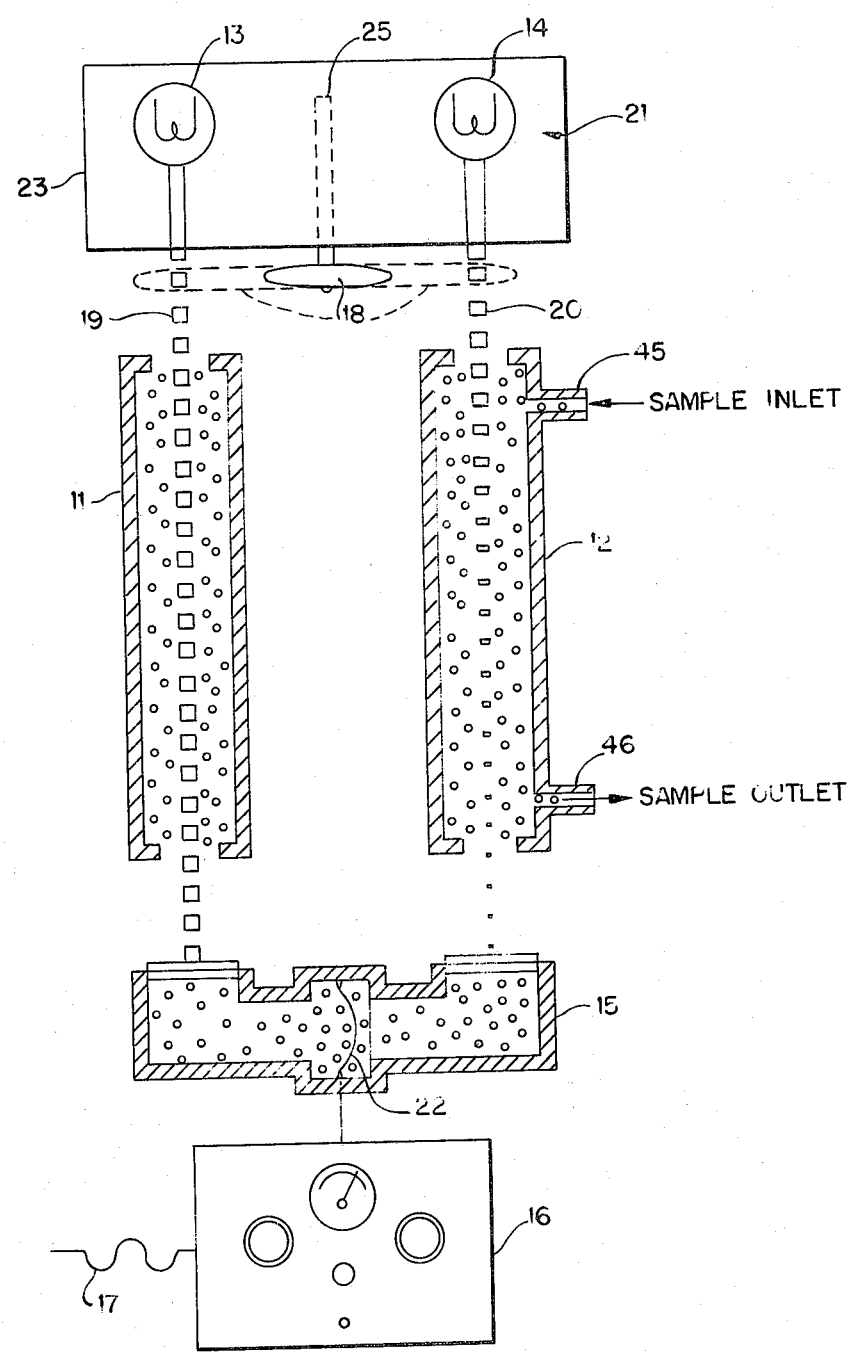

In a gas analyzer operating by selective absorption of infrared radiation such as illustrated in German Pat. No. 730,478 of 1938, for example, there are two gas-containing cells such as a reference cell 11, a sample cell 12, infrared sources 13 and 14 for directing rays or beams of infrared radiant energy through the cells 11 and 12, respectively, and a detector 15 for comparing the absorption of infrared energy in the cells 11 and 12. There may be an electronic amplifier and recorder 16 for producing a record curve 17 representing the results of the analysis. In one version of such apparatus there is a "chopper" or revolving shutter 18 to cut off both beams 19 and 20 simultaneously so as to produce pressure pulses in the gas cells 11 and 12 resulting from the energy absorption heating effects of the intermittent beams 19 and 20. Although separate photoelectric cells may be employed for energizing differentially connected photoelectric cell amplifiers so as to produce the alternating waveform 17, the detector 15 in FIG. 1 is shown as being of the vibrating diaphragm type having a diaphragm 22 which is deflected back and forth in response to pressure pulses produced in gas of the unit 15 on either side of the diaphragm 22 and there is a stationary plate (not shown) mounted in a fixed position at one side of the diaphragm 22 so that a variable capacitor is formed to produce fluctuations in an electrical circuit in the electronic unit 16.

In accordance with the invention a housing or casing 23 is provided for the infrared sources 13 and 14 and the drive mechanism for the rotating shutter 18 to form a self-contained radiant energy unit 21 which may be adjusted to compensate for phase and amplitude unbalance. Although the invention will be described as employed in a particular type of gas analyzer of the selective absorption type it will be understood that the invention is not limited thereto and may be employed in any apparatus utilizing a pair of rays or fluctuating or alternating intensity radiant-energy beams such as luminous, ultraviolet beams or the infrared beams 19 and 20, and the effects of the two beams are compared. In accordance with the invention the infrared or other beam-generating radiant-energy sources 13 and 14 are mounted as a unit upon a movable mounting or support 24 (FIG. 3). The radiant energy source support 24 and the support and drive mechanism for the rotating shutter 18, represented in FIGS. 1 and 2 by the motor shaft 25, are mounted relatively movable with respect to each other. In the embodiment illustrated in the drawings the motor shaft 25 rotates in a bearing 26 secured in the housing 23 and the radiant energy mounting 24 is slidable upward and downward in the housing 23.

Figure 2:
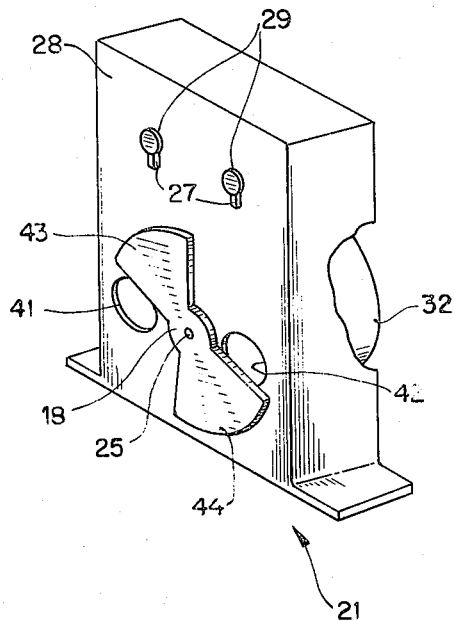
Figure 3:
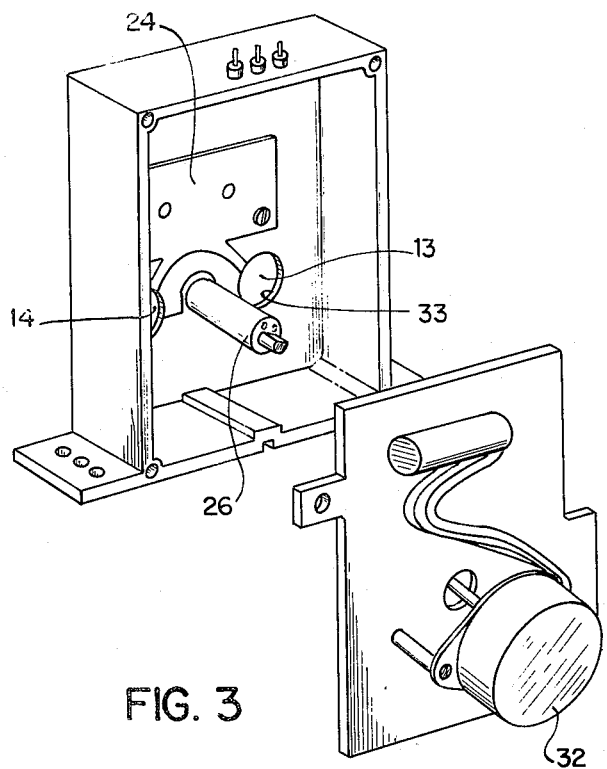

As shown in FIG. 2, there are vertical slots 27 in the front wall 28 of the housing 23, adapted to receive machine screws 29 engaging threaded openings 31 in the infrared source mounting 24, to permit the mounting 24 to be adjusted upward or downward, thereby adjusting the vertical position of the sources 13 and 14. Any suitable drive means for the rotatable shutter supporting shaft 25 may be employed, such as a motor 32.

Figure 4:
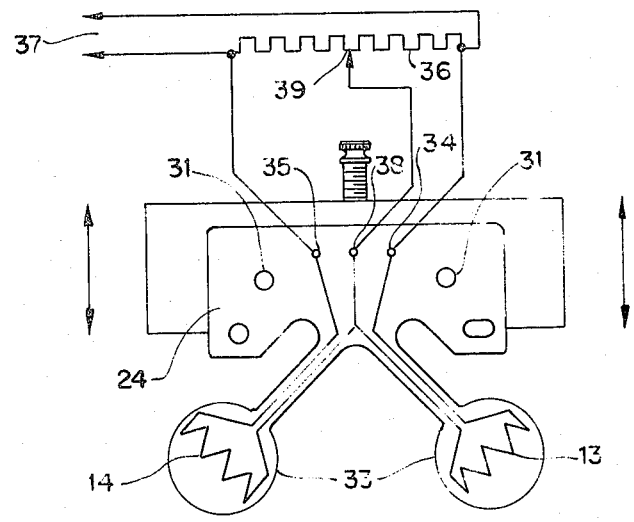

The infrared-ray generating assembly 21 which provides both mechanical phase adjustment and amplitude balance is illustrated in FIG. 4. In the embodiment illustrated the infrared rays 19 and 20 are provided by a dual cermet source comprising electrical resistance elements 13 and 14 mounted in cavities or sockets 33 formed in the mount 24, which it will be understood is composed of suitable insulating material. The electrical resistance elements 13 and 14 are connected in series to electric terminals 34 and 35, which in turn are connected to the ends of a potentiometer resistor 36, which is connected to a source of electrical current 37. The junction of the series-connected resistance elements 13 and 14 is connected to a junction terminal 38, which is connected to a tap 39 slidable upon the potentiometer resistor 36. In this manner the distribution of power, voltage and current between the resistance elements 13 and 14 or infrared radiators may be adjusted to adjust the relative intensity of the radiation for effecting amplitude balance of the response to the beams 19 and 20.

As illustrated in FIG. 2, the front wall 28 of the housing 23 has two openings or apertures 41 and 42 behind which the radiant energy sources 13 and 14 are mounted. The apertures 41 and 42 may, if desired, be closed by mica windows which are transparent to infrared radiation. The rotating shutter 18 has a hub carrying two sectors 43 and 44 so dimensioned that the windows 41 and 42 may be either fully closed or fully opened simultaneously, becoming partially closed simultaneously as the shutter 28 rotates.

However, the instant at which the sector 43 or 44 begins to cut off radiation beams 19 and 20 depends upon the location of the infrared sources 13 and 14, or their distances from the edges and axes of the windows 41 and 42 measured transversely to the directions of the beams 19 and 20 and transversely to the axes of the windows 41 and 42. In the embodiment illustrated the instant of radiation cut off depends upon the vertical position of the infrared source 13 or 14 with respect to the window 41 or 42. The instant of cut off is likewise seen to be dependent upon the vertical position of the infrared sources with respect to the axis of rotation of the shutter blades 43 and 44 since the shutter drive is mounted to the same wall 28 which contains the openings 41 and 42. Assuming clockwise rotation of the shutter 18 as seen in FIG. 2, the source behind the window 41 will be cut off later and the source behind the window 42 will be cut off earlier if the unit carried by the mount 24 is moved upward along the wall 28 parallel thereto and transverse to the beams 19 and 20 and to the axes of the windows 41 and 42 by means of the adjustment provided by the slots 27 and the securing screws 29, and vice versa. The same relationship will hold for the instant at which the beams are again exposed through the windows 41 and 42. Consequently, a mechanical phase adjustment is provided.

OPERATION

In making gas analyses in apparatus of the type illustrated in FIG. 1, the sample to be analyzed is introduced into the sample cell 12 through an inlet opening 45 and withdrawn through an outlet opening 46. Assuming that the beams 19 and 20 are balanced with respect to amplitude and phase and that there is no amplitude or phase unbalance in the detection apparatus 15 and 16, a measurement of the absorption of infrared energy in the sample cell 12 and the reference cell 11 will give a null reading. The reference cell 11 may be empty or may contain a standard concentration of the constituent.

Figure 5:
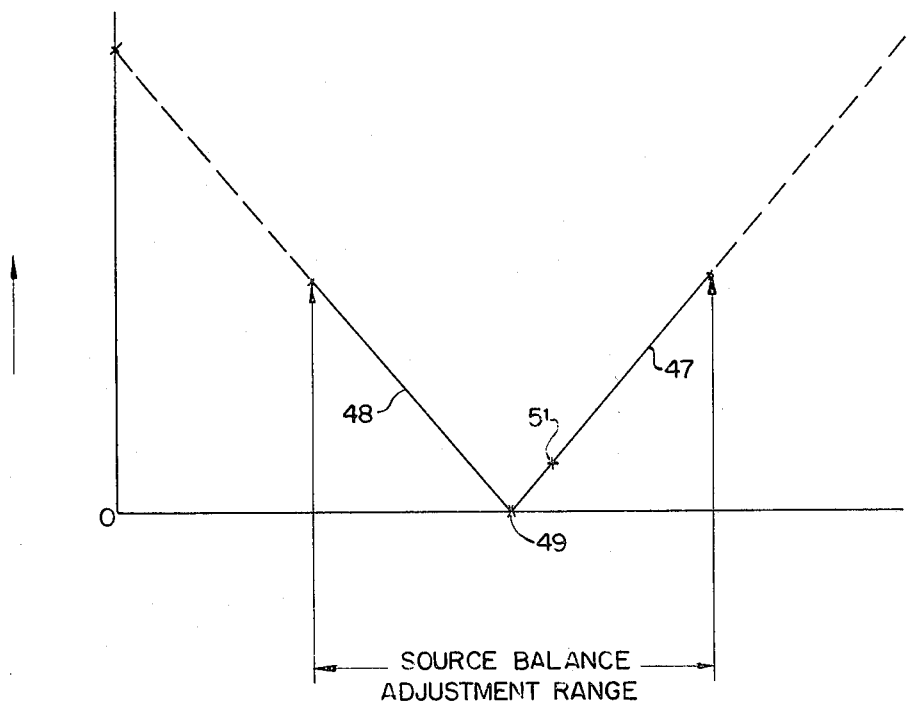

The response of the instrument 16 will then be represented by the graph of FIG. 5 which is linear, consisting of two sloping portions 47, 48 intersecting at a point 49 on the zero or base line of the graph, which is the reading for the assumed condition. On the graph, the vertical direction represents up-scale deflection of the instrument 16 and the horizontal direction represents amplitude balance adjustment. If there is an unbalance in the beam intensities or in the internal elements of the detector 15 and the instrument 16, the actual deflection of the instrument 16 will be represented by a point such as a point 51 when the apparatus is calibrated by introducing identical compositions in the reference cell 11 and the sample cell 12. Such unbalance may then be adjusted by resetting the potentiometer slider 39 shown in FIG. 4 to restore the indication to the null point 49. In practice, however, an instrument is generally operated around point 51 to avoid the possibility of an erroneous reading. Were the instrument operated exactly at point 49 and then the instrument drifted so as to move the operating point 49 toward the left, then the reading would be in error by the initial downscale deflection produced by introducing a sample gas.

On the other hand, if there should be a phase unbalance in the beams 19 and 20 or in the internal elements and circuitry of the elements 15 and 16, it will not be possible to bring the deflection to a sharp zero point 49 during calibration with identical compositions in the cells 11 and 12. Instead the deflection will be represented by a curvilinear graph showing a broad minimum at point 52. This is the case since the pressure pulses arrive at the opposite sides of the diaphragm at slightly different times and hence there is no way of achieving a zero detector output by altering the relative amplitude of these two pulses. Although there may be instantaneous off-center points at which two harmonic waves will balance each other, the demodulated signal cannot reach zero unless the two pressure pulses arrive in phase as well as with the same amplitude.

Figure 6:
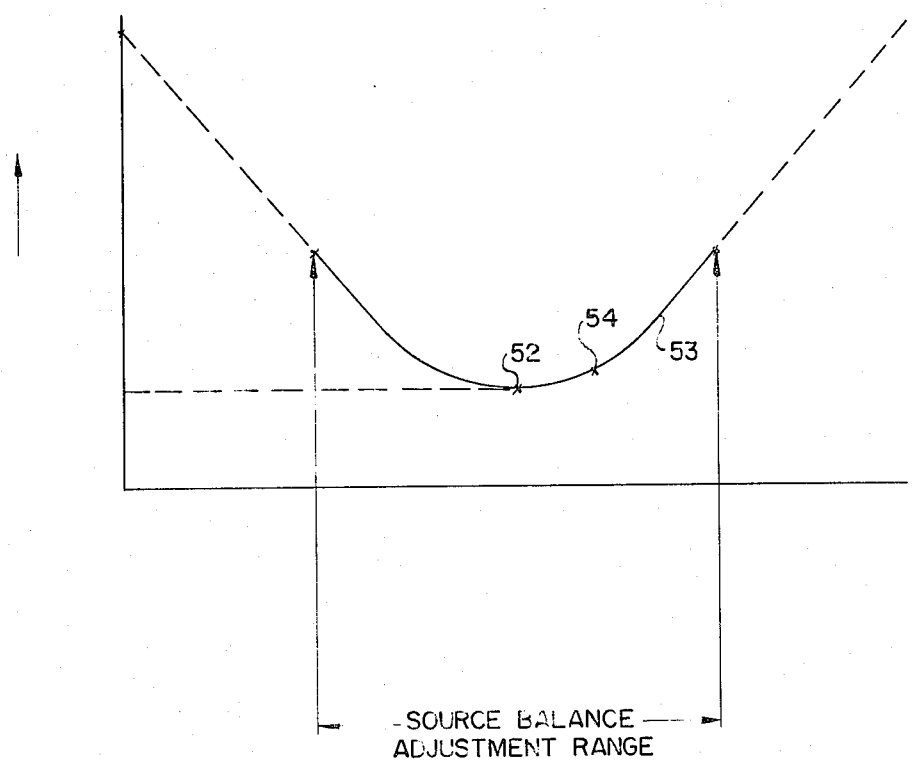

The most practical way for adjusting the balances during calibration of the apparatus with identical constituents in the cells 11 and 12 is to balance amplitude first by the slider 39 in order to obtain the point at which a minimum indication or signal is received from the instrument 16. Then the phase is adjusted by moving the mounting 24 in order to bring the minimum deflection down to the zero value or base line in the graph of FIG. 6. Balance may then be readjusted if necessary when more precise amplitude balance becomes possible by elimination of the phase unbalance and the deflection follows the more nearly rectilinear curve of FIG. 5.

While a particular form of the invention has been fully illustrated and described, it will be obvious to those skilled in the art that various modifications and alterations may be made therein and it is intended to cover all such modifications and alterations as may fall within the spirit and scope of the invention.

What is claimed is:

1. In a fluid analyzer of the twin beam type having a pair of beam sources and means for passing one beam through a sample and the other through a standard, a detector for comparing absorption by the standard and the sample, a moving shutter with a pair of vanes for intermittently interrupting the beams and means for varying the phase relationship between the beams with respect to the time of interruption, the improvement in phase adjustment means comprising:
   a common support for the beam sources and
   means for varying the relative position transversely to the beams of the common beam support and the shutter mounting for simultaneously, transversely varying the positions of the beams with respect to the shutter mounting.

2. The apparatus described in claim 1 wherein the shutter comprises means mounted upon a rotatable shutter shaft having an axis of rotation and which is supported in bearing means and the adjusting means comprises means for moving one of said bearing means and said beam source common support relative to the other transversely with respect to said axis of rotation.

3. The apparatus described in claim 2 wherein the shutter bearing means and the beam source common support are mounted in a unit and the beam source common support is slidable in said unit transversely to the axis of rotation of the shutter shaft.

4. Apparatus described in claim 3 wherein the unit has a wall with a pair of apertures therein having edges, the shutter shaft extends through said wall with the shutter mounted in front of the wall and the beam sources mounted behind the wall, each at one of said apertures, whereby relative movement of the beam source common support and the bearing means varies the relative time of cut-off of the beam by the shutter at an aperture edge.

5. In the method of fluid analysis by comparison of radiant beam absorption in a standard and a sample including the step of intermittent beam interruption, the improvement which consists of overcoming unbalanced conditions resulting from errors in phase relationship and intensity relationship of the beams in the comparison process comprising the steps of:
   first adjusting the relative intensities of the beams until a minimum value of radiant beam absorption indication is obtained,
   then adjusting the time phase relationship between the instant when one beam is interrupted and the instant when the other beam is interrupted until the indication obtained most nearly falls to zero to enable most nearly zero readings to be obtained when the standard and the sample are identical and phase errors have been corrected.

* * * * *